United States Patent [19]
McGregor, Jr.

[11] 4,428,688
[45] Jan. 31, 1984

[54] RETAINER AND BEARING ASSEMBLY

[75] Inventor: John C. McGregor, Jr., Springfield, Ohio

[73] Assignee: Pentaflex, Inc., Springfield, Ohio

[21] Appl. No.: 256,358

[22] Filed: Apr. 22, 1981

[51] Int. Cl.³ .............................................. F16C 23/04
[52] U.S. Cl. ................................... 384/208; 384/207
[58] Field of Search .............. 384/439, 207, 206, 208, 384/209, 203, 204, 210; 277/136

[56] References Cited

U.S. PATENT DOCUMENTS

| | | | |
|---|---|---|---|
| 3,483,888 | 12/1969 | Wurzel | 384/204 |
| 3,529,874 | 9/1970 | Hoddy | 384/204 |
| 3,701,574 | 10/1972 | Phillips | 384/204 |
| 4,095,803 | 6/1978 | Meier et al. | 277/136 |

Primary Examiner—Lenard A. Footland
Attorney, Agent, or Firm—Biebel, French & Nauman

[57] ABSTRACT

The present invention provides a retainer comprising a substantially planar support member having an opening therein designed to receive an annular member such as a bearing. Around the opening a plurality of slits are formed extending generally radially outwardly from the opening to form a plurality of retainer lips. The retainer lips are bent out of the plane of the support member such that the retainer will receive and fixedly engage the bearing in a snap fit. Bearing guides and steps may be used in aligning the bearing in the retainer.

16 Claims, 7 Drawing Figures

RETAINER AND BEARING ASSEMBLY

BACKGROUND OF THE INVENTION

The present invention relates generally to retainers for cylindrical bodies and more particularly, to a retainer for a greaseless or cam pillow-block bearing.

A typical greaseless or cam bearing is an annular member formed of a high durability material having a low coefficient of friction. Polytetrafluoroethylene, nylon and oil-filled powder metal are commonly used in the pillow-block bearings which are commercially available. Conventionally, these bearings are mounted or encased in a housing generally made from sheet metal. The housing is formed by joining two metal pieces each designed to fit over and support one end of the bearing. Such housings, however, are undesirable because to assemble the bearing assembly, the bearing must be positioned in one-half of the housing and the other half must be positioned over the bearing and then joined to the first half of the housing. As a result, at least three steps are involved in the assembly: positioning the bearing, positioning the two housing halves, and joining the two housing halves together. In addition, such retainers are relatively expensive to make. They require use of a large amount of metal, casting both halves in separate molds, etc. They may also require the use of fasteners such as rivets, cap screws, nuts, etc. to maintain the assembly which involves the additional expense required to install the fasteners. Accordingly, there is a need for a low-cost bearing assembly which can be assembled in fewer steps, with less handling, requires less structure to support the bearing.

SUMMARY OF THE INVENTION

The present invention provides a retainer comprising a substantially planar support member having an opening therein designed to receive an annular member such as a bearing. Around the opening a plurality of slits are formed extending generally radially outwardly from the opening to form a plurality of retainer lips. The retainer lips are bent out of the plane of the support member such that the retainer will receive and fixedly engage a cylindrical member having a bevelled surface in a friction fit.

The retainer of the present invention can be used in a wide variety of applications. One of its principal applications is in a bearing assembly. There it may be used with a variety of bearings in a number of situations. For example, it may be used as a retainer for a brake cam shaft bearing on truck-trailer axles, as a retainer for greaseless bearings for rotating shaft power transmissions on vehicles and implements, as a retainer for bearings in a construction machinery, metal working machinery, etc. It may even find use as a retainer for guides and supports for shafts and rods, such as a tuning rod or push-pull on/off knob shafts for radios, televisions and other equipment. It is also useful as a support for a bulkhead fitting and applications are envisioned in prosthetic devices. The retainer of the present invention is also applicable to other situations where cylindrical or donut-shaped bearings, guides and supports are used, as will occur to one of ordinary skill in the art.

The reason for the wide application for such a retainer is that its simplicity of construction does not sacrifice any of the functions of the types of retainers previously used. It is as durable and adaptable as prior art retainers, and yet easier and cheaper made and more simple to use. In most cases the retainer can be assembled with a bearing, fitting or guide by hand or with hand tools.

Accordingly, it is an object of the present invention to provide a simplified and improved retainer for bearings, guides, supports and other bodies which can generally be categorized as having a cylindrical or annular body the outer circumferential surface of which is bevelled.

Another object of the present invention is to provide a one-piece retainer which can be manufactured from low cost materials and which can be assembled with a bearing or the like by hand.

Other objects and advantages of the present invention will be apparent from the following description, the accompanying drawings and the appended claims.

DETAILED DESCRIPTION OF THE INVENTION

Figure 1:
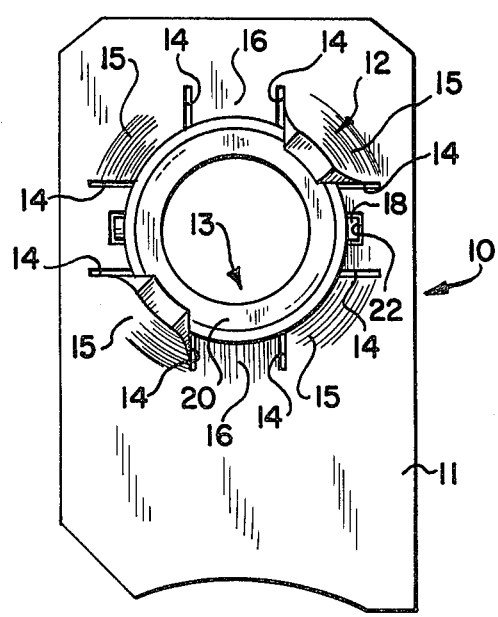
FIGS. 1 and 2 illustrate frontal and side views, respectively, of a bearing assembly utilizing one embodiment of the retainer in accordance with the present invention.

A preferred embodiment of the retainer and bearing assembly of the present invention is generally indicated by the numeral 10 in FIG. 1. The bearing assembly 10 comprises a generally planar support member 11 having a retainer, generally designated 12, formed therein which is adapted to receive a pillow-block bearing 20 of a type well-known in the art, in a snap fit. Thus, support member 11 as shown in FIG. 1 has a circular opening 13 formed therethrough and a plurality of slits 14 extending generally radially outwardly from the opening to form a plurality of retainer lips 15. These retainer lips 15 are an integral part of the support member 11 and are bent out of the plane of the support member.

Figure 2:
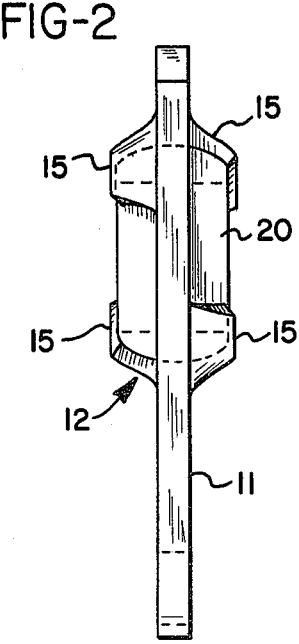
Figure 5:
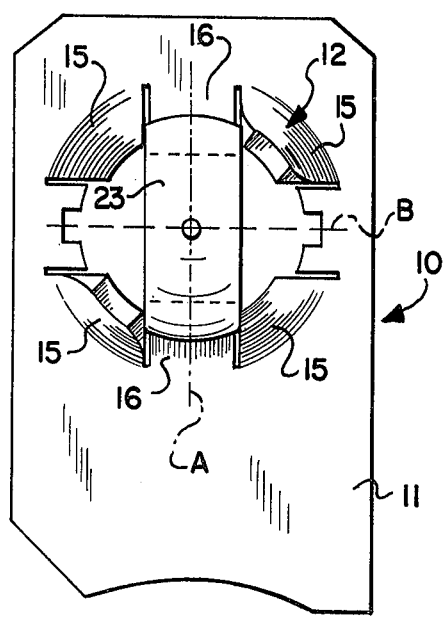
FIGS. 5 and 6 illustrate the assembly operation of the retainer and a bearing.
Figure 6:
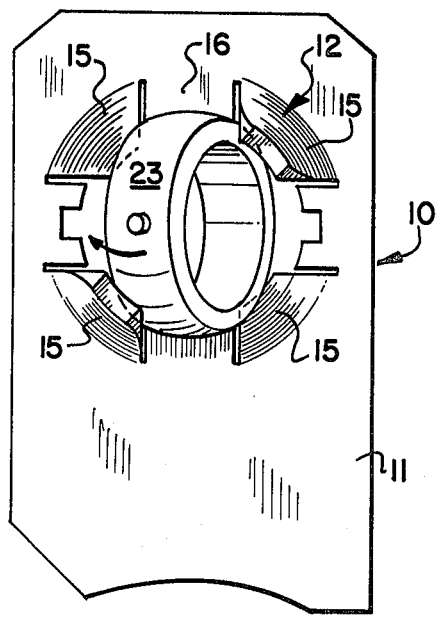

As shown in FIG. 2, the retainer lips are alternately bent to one side of the support member 11 and the other so as to fixedly engage the pillow block bearing 20. The retainer lips 15 are bent outwardly sufficiently so that they will retain bearing 20 in a snap fit. Thus, the retainer lips 15 must permit bearing 20 to be assembled with the retainer 12 and fixedly hold it. The assembly of the bearing and retainer is illustrated in FIGS. 5 and 6 and discussed below in more detail. The retainer lips 15 may be adjusted to accommodate varying convexities of the outer surfaces of bearings by limiting their length or increasing the angle they make with the support 11. In this manner, the retainer 12 enables a one-step hand assembly in which the bearing 20 is turned into the retainer as discussed below.

The number of retainer lips 15 will vary with the size and function of the retainer. Typically, there will be 4 or 6, but any even number may be suitable. Optionally, the retainer 12 includes abutments 16 in FIG. 1. These abutments 16 are portions of the support member 11 bordering the circular opening 13 and are defined by the slits 14, but which are not bent from the plane of the support member. The abutments 16 are useful in those cases where the bearing 20 tends to rotate within the retainer 12. To prevent the bearing 20 from rotating within the retainer, the bearing may be formed with at least one stop 18 which is received in a slot 22 formed in one or more of the abutments 16. Where the bearing, for example, supports an oscillating type motion parallel its center axis, there may not be a tendency to rotate and the retainer can be formed entirely of retainer lips which are alternately bent to one side of the support and the other without the use of stops and guides. On the other hand, because there are fewer retainer lips, the retainer with abutments is in some cases easier to manufacture.

Figure 3:
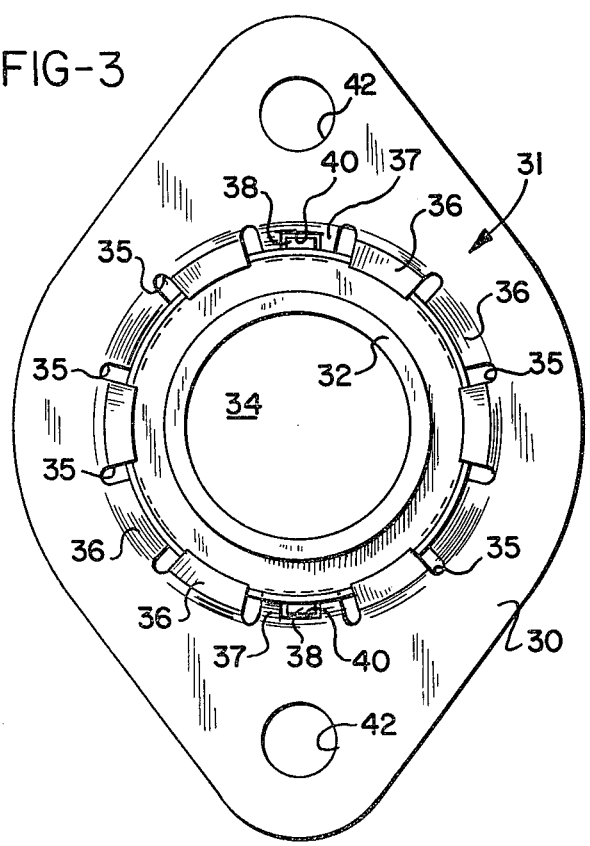
FIGS. 3 and 4 are frontal and side views, respectively, of another assembly utilizing an alternative embodiment of the retainer in accordance with the invention.
Figure 4:
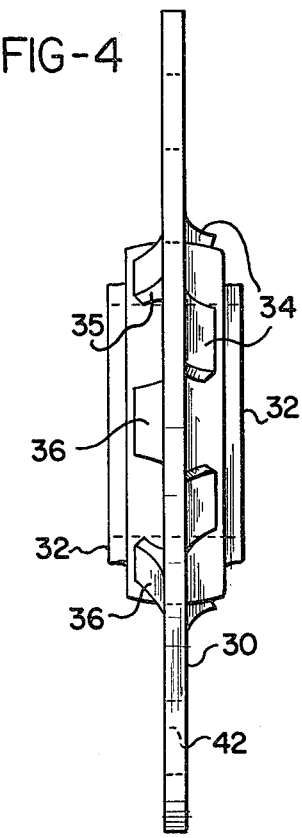

FIG. 3 and FIG. 4 show another embodiment of the bearing assembly of the invention wherein a planar support member 30 has a retainer 31 which includes a generally circular opening 34 and a plurality of slits 35 extending generally radially outwardly from the opening to form retainer lips 36. The retainer lips 36 are bent outwardly from the support member 30 in both directions to fixedly engage the convex outer surface of a pillow block bearing 32. In the embodiment shown in FIG. 3, two abutments 37 are present positioned diametrically opposite each other. The bearing 32 is formed with two stops 38 which are received within slots 40 in the abutments 37.

One of the chief advantages of the retainer of the present invention is that it can be assembled with bearings, guides, fittings and the like by hand or with hand tools. One such assembly is illustrated in FIGS. 5 and 6 for a pillow block bearing 20. Because the retainer lips 15 alternate to each side of the support member 11, there are diametric positions in the retainer 12 as indicated by dotted lines A and B in FIG. 5 where a bearing turned on its side will fit through the support member 11 with minimal or no interference. In FIG. 5 the bearing 20 is positioned on the diameter A with its center axis parallel to the page and perpendicular to the center axis of the retainer opening. To hand assemble a bearing and the retainer of the present invention, the bearing 20 is placed through the retainer 11 on the line A or B in FIG. 5 and rotated 90° until the center axis 21 of the bearing 20 is perpendicular to the plane of support member 11. As the bearing 20 is rotated in the retainer 12 its bevelled face 23 rotates into frictional engagement with the retainer lips 15 on each side of the support member 11 as shown in process in FIG. 6. For the assembled bearing reference is made to FIGS. 1 and 2 above.

The support member 30 generally has a planar construction and may be formed of a variety of materials selected depending on the expense and the load that will be exerted on the retainer. Among other materials, it may be formed of plate metal, spring steel and some heavy duty plastics. The support member may be formed with mounting means such as the apertures 42 in FIG. 3. The support member 30 may also be formed with a flange (not shown) for mounting. In this case the support member 30 is still considered planar, although members such as a mounting flange and the retainer lips 36 extend from the plane of the support member.

Those skilled in the art will recognize that the retainer of the present invention can also be used to support and retain members other than pillow block bearings. In particular, the retainer design of the present invention can be used any time a snap fit is desired about an annular member such as a cylindrical or doughnut-shaped body and particularly a body having a bead or projection on its outer surface providing a convexity that can be engaged by the retainer lips. Hence, as mentioned previously, embodiments are envisioned in which the retainer of the present invention is used to mount appropriately designed ornaments, knobs, axles and the like.

Figure 7:
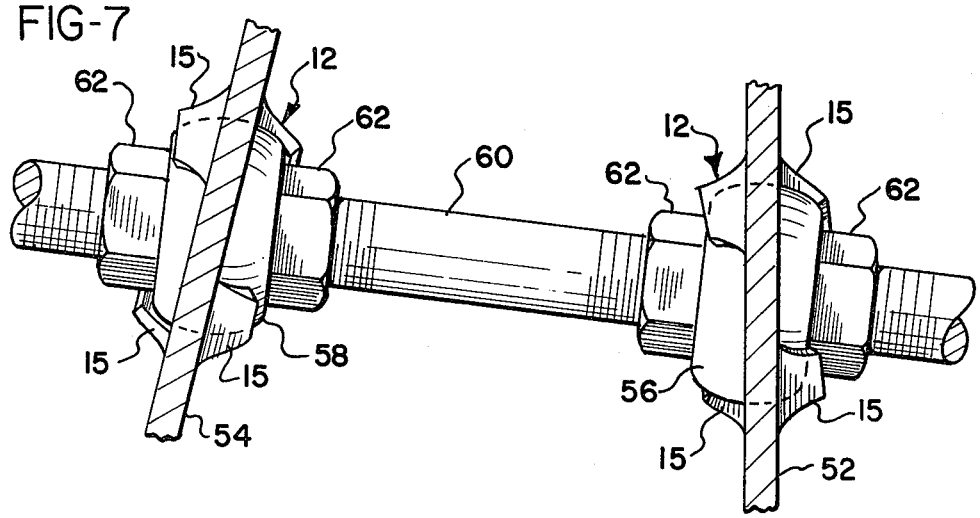
FIG. 7 shows another embodiment of the invention in which the retainers are embodied in plates or panels tied to each other by a rod.

FIG. 7 illustrates still another application for the retainer of the present invention in which the retainer 12 is installed in a pair of panels or bulkheads 52 and 54 joined by a tie rod 60. Referring to FIG. 6 each of panels 52 and 54 has formed therein or attached thereto a retainer of the present invention 12. Retainers 12 have mounted therein a pair of fittings 56 and 58 which receive tied rod 60. Tie rod 60 is stretched between panels or bulkheads 52 and 54 and fixed in place by jam nuts 62. The retainer design of the present invention is such that although panels or bulkheads 52 and 54 are not square with one another and there is a slight pitch to the tie rod 60, the fittings 56 and 58 can tilt in the retainer to accommodate the different alignments between the tie rod and the panel members.

Having described the invention in detail by reference to specific embodiments thereof, those skilled in the art will recognize that numerous modifications and variations are possible therein without department from the spirit and scope of the following claims.

What is claimed is:

1. A retainer for a bearing having a spherical outer surface comprising:
    a substantially planar support member having an opening therein,
    a first pair of diametrically opposed rigid lip members extending into said opening and curving outwardly from one face of said planar member, and
    a second pair of diametrically opposed rigid lip members extending into said opening and curving outwardly from the face of said planar member opposite said first pair of lip members,
    said retainer being further characterized in that the length and angle of inclination of said lip members relative to said support member are such that a bearing having an outer spherical surface can be inserted into said opening with its central axis parallel of said planar member and rotated such that its central axis is normal to said planar member whereupon said lip members fixedly engage said bearing such that relative axial movement between said bearing and said planar member is prevented.

2. The retainer of claim 1 wherein said retainer lip members are alternatively positioned on each side of said support member.

3. The retainer of claim 1 wherein said lip members number four or six.

4. The retainer of claim 1 wherein said support member has mounting means.

5. The retainer of claim 1 wherein said retainer additionally comprises a pair of diametrically opposed, radially inwardly extending abuttments, at least one of said abuttments having a slot therein.

6. The retainer of claim 1 wherein said retainer is formed of plate metal.

7. The retainer of claim 1 wherein said outwardly curving lip members are formed with a spherical retaining surface which faces upon the opening in said planar member.

8. A bearing retainer assembly comprising:

a bearing having a spherical outer surface and a retainer, wherein said retainer is characterized in that it comprises:

a substantially planar support member having an opening therein, a first pair of diametrically opposed ridgid lip members extending into said opening and curving outwardly from one face of said planar member and a second pair of diametrically opposed ridgid lip members extending into said opening and curving outwardly from the face of said planar member opposite said first pair of lip members, said retainer being further characterized in that the length and angle of inclination of said lip members relative to said support members are such that a bearing having an outer spherical surface can be inserted into said opening with its central axis parallel of said planar member and rotated such that its central axis is normal to said planar member whereupon said lip members fixedly engage the spherical surface of said bearing and prevent relative axial movement between said bearing and said retainer.

9. The assembly of claim 8 wherein said retainer comprises a pair of diametrically opposed, radially inwardly extending abuttments, at least one of said abuttments having a slot formed therein.

10. The assembly of claim 8 wherein said retainer is formed of plate metal.

11. The assembly of claim 8 wherein said lip members are formed with a spherical retaining surface which faces upon the opening in said planar member.

12. The assembly of claim 8 wherein said bearing is a pillow block bearing.

13. The assembly of claim 8 wherein said retainer up members are alternately positioned on each side of said support member.

14. A retainer for a bearing having a spherical outer surface comprising:

a substantially planar member having a generally circular opening therein;

a first pair of rigid diametrically opposed lip members extending into said opening and curving outwardly from one face of said planar member; and a second pair of rigid diametrically opposed lip members extending into said opening and curving outwardly from the face of said planar member opposite said first pair of lip members, said lip members providing an internal spherical retaining surface which faces upon said opening in said planar member and fixedly engages the spherical surface of a bearing assembled with said retainer, said retainer being further characterized in that the length and angle of inclination of said lip members relative to said support member are such that a bearing having an outer spherical surface can be inserted into said opening with its central axis parallel said planar member and rotated such that its central axis is normal to said planar member whereupon said lip members fixedly engage said bearing such that relative axial movement between said bearing and said planar member is prevented.

15. The retainer of claim 14 wherein said retainer further comprises a pair of diametrically opposed radially inwardly extending abuttments.

16. The retainer of claim 15 wherein at least one of said abuttments has a slot formed therein.

* * * * *